Jan. 8, 1929.
F. A. WHITTEN
1,698,147
AUTOMOBILE RADIATOR CLOSURE
Filed Feb. 2, 1927
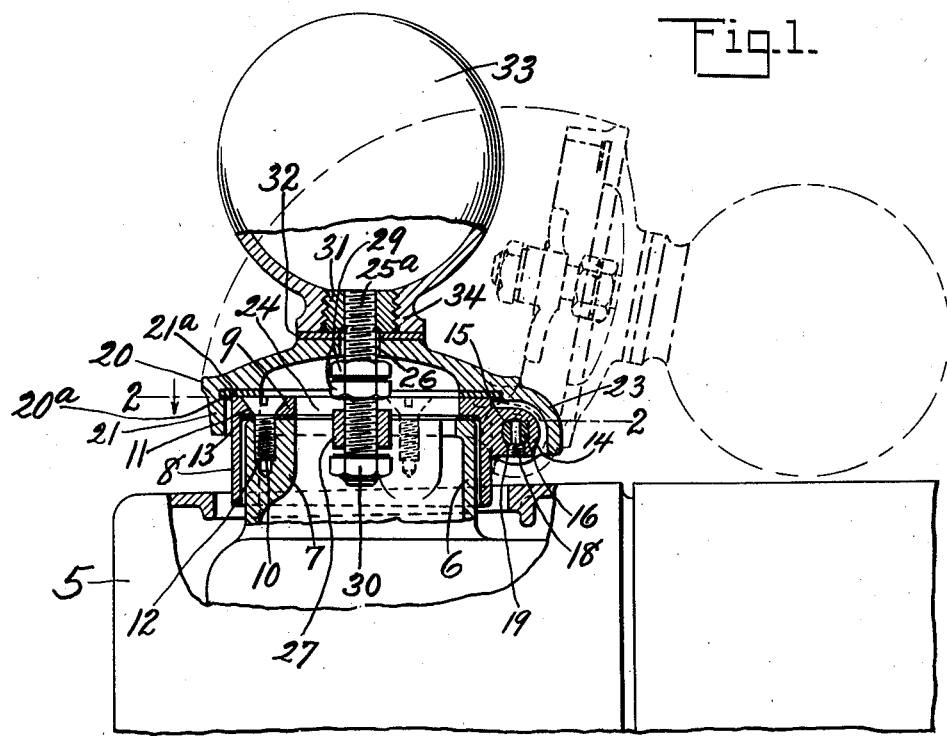
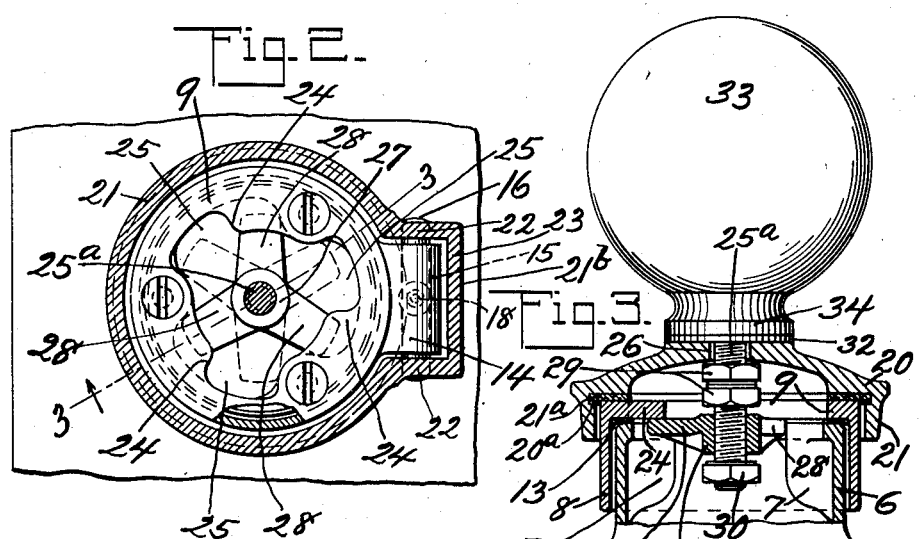
INVENTOR
Frank A. Whitten
BY *F. H. Gibbs*
ATTORNEY Patented Jan. 8, 1929.

1,698,147

UNITED STATES PATENT OFFICE.

FRANK A. WHITTEN, OF DETROIT, MICHIGAN, ASSIGNOR TO AMERICAN CAR AND FOUNDRY MOTORS COMPANY, OF NEW YORK, N. Y., A CORPORATION OF DELAWARE.

AUTOMOBILE RADIATOR CLOSURE.

Application filed February 2, 1927. Serial No. 165,423.

Reference is had to the accompanying drawings which illustrate the preferred form of the invention, though it is to be understood that the invention is not limited to the exact details of construction shown and described, as it is obvious that various modifications thereof within the scope of the claims will occur to persons skilled in the art.

In the drawings:

Fig. 1 is a view partly in vertical section and partly in elevation of my improved radiator cap, parts of the radiator being shown as broken away, while the broken line indications illustrate the cap in open position;

Fig. 2 is a horizontal section on line 2—2 of Fig. 1; and

Fig. 3 is a vertical sectional view of the device taken at right angles to Fig. 1.

My invention relates to automobile radiator closures or caps, and has for its principal object the provision of an automobile radiator cap, which when open will be entirely disposed at one side so as to permit the entire radiator filling opening to be unobstructed and thus afford a filling opening of a maximum size.

A further object of the invention is to provide an automobile radiator cap wherein the cap or closure element is positively locked on the filling opening of the radiator, producing a water tight joint and obviating the loss of such cap or closure.

The invention also contemplates an automobile radiator cap that is of comparative simple construction, and one not likely to become inoperative.

Another object of the invention resides in the provision of an automobile radiator cap embodying a hinged or pivoted closure or cap, together with a novel latch means for positively latching the cap or closure in position to close and seal the radiator.

It is also an object of the invention to provide a radiator cap or closure having a weighted ornamented hinged cap element, which when in an open position will be effectively supported so that the cap ornament cannot contact with the varnished surfaces of the automobile and hence scar or otherwise mutilate the same.

Referring to the invention in detail, an automobile radiator is designated at 5 and includes the usual filling neck 6, the latter being formed with spaced internal lateral enlargements 7. A collar 8 is received on the neck 6, and is formed with an inwardly directed annular flange 9 at its upper edge, which rests upon the upper edge of the neck and enlargements 7. Suitable screws or other convenient fastening elements 10 pass through openings 11 in the flange 9, and are engaged in threaded registering bores 12 in these enlargements. A packing washer 13 is interposed between the upper face of the neck 6 and the under face of the flange 9.

As disclosed in Fig. 1, the collar 8 is formed with a laterally projecting rectangular extension 14, having a longitudinal bore 15 extending the entire length thereof and receiving the hinge pin 16, whose ends project beyond the extension. For the purpose of securing the hinge pin in place, a set screw 18 is engaged in a threaded opening 19 formed in the underface of the extension and passes transversely through the hinge pin. Adapted to rest upon the flange 9 is a cap or closure 20 having a circumferential depending flange 21 skirting the collar 8. Carried in a circumferential groove $20^a$ in the inner face of the flange 21, and normally contacting with the cap and flange 9 is a packing ring or gasket $21^a$, to produce a water tight joint between these parts. The cap or closure 20 is cast with a boss $21^b$ U-shaped in horizontal cross section, which overlies the extension 14 and has its parallel legs pivotally received on the projecting ends of the hinge pin 16 as at 22. The end wall 23 is longitudinally curved, and the lower extremity thereof constitutes a stop or abutment to contact with the collar 8 when the device is in open position to limit the opening movement of the cap as will be apparent so that an ornament, to be hereinafter referred to, carried by the cap cannot contact with the adjacent part of the automobile.

In order to latch the cap or closure in positive water tight engagement with the radiator filling neck, latch means are provided which consist of a plurality of circumferentially spaced lugs 24 formed about the inner edge of the flange 9. These lugs are formed by producing a plurality of spaced openings 25 in triangular formation.

An ornamental handle for the cap is shown at 33, the handle in the instance shown being a hollow sphere, but it is to be understood that this is merely by way of example as obviously the handle may assume any desired or preferred form. The handle is provided with an internally threaded boss 34 which receives a bushing 31 into which latter the upper end of a threaded stem 25ª is tightly fitted. The stem 25ª extends upwardly through an opening 26 in the cap 20 and then into the bushing and for sealing purposes a gasket 32 is arranged between the cap and the boss 34. The stem is provided with nuts 29 which are arranged adjacent the under surface of the cap 20 but which are not in close engagement with said under surface in order to permit free rotation of the handle 33 and the stem 25ª for a purpose to be presently described.

On the stem 25ª adjacent its lower end is a locking element comprising a hub 27 which is threadedly engaged on the stem and from which a plurality of locking bars 28 radially project; the latter being disposed in relative triangular relation to accord with the before-mentioned openings and retaining lugs 25 and 24 respectively. The extreme lower end of the stem 25ª is provided with a nut 30 which functions as a stop element for limiting the downward movement of the hub 27 whereby the latter will not be backed off of the stem 25ª.

It is believed that the construction of the device will be clear from the above description, and referring to the operation thereof, it can be seen that when the cap is attached to the radiator or other container by the pin 16, to permit access to the radiator for filling purposes, the cap is swung to the position shown in dotted lines in Fig. 1, the lower end of the wall 23 contacting with the collar 8 to limit the opening movement of the cap. To secure the cap in closing position with respect to the filling neck of the radiator, said cap is swung over the radiator neck and the handle 33 is manipulated by being rotated whereupon the stem 25ª will of course be rotated and the locking bars 28 will enter the openings 25. Continued rotation of the handle 33 turns the stem 25ª which movement it will be apparent will rotate the locking bars 28 to a position beneath the lugs 24, whch movement of the bars 28 will be limited by the vertical abutments 7 in the neck. Further rotation of the handle 33 and the resultant turning of the stem 25ª will carry the hub 27 upwardly on the stem 25ª until the bars 28 are in close engagement with the under surfaces of the lugs 24 and the cap 20 thus tightly engaged against the upper edge of the collar 8; it being apparent that in effect the cap is pulled downwardly by the engagement of the locking bars with the under surfaces of the lugs 24.

This invention has been particularly specified as being a closure for the filling neck of a radiator for a motor vehicle, but such an adaptation is merely illustrative, as it is apparent that the principles outlined herein and the construction shown in the drawings and described in the specification is readily susceptible of use with any container having a filling opening or a filling neck, and it is not to be understood that the applicant restricts himself to a closure for the filling neck of a radiator for a motor vehicle.

What I claim is:

1. In combination, a container having a filling neck, internal abutments formed in the neck, a collar secured to the neck and provided with locking lugs arranged over the neck, a cap hingedly connected to the filling neck and adapted to be swung on its hinge to uncover the filling neck, and means for locking the cap to the filling neck comprising a rotatable handle, a stem secured to the handle and normally positioned in the neck, and locking bars carried by the stem and adapted to be engaged under the locking lugs upon rotation of the handle and stem, continued rotation of said stem elevating the bars to engage the latter with the under surfaces of the locking lugs.

2. In combination with a motor vehicle radiator having a filling neck, vertically arranged abutments in said neck, a collar secured to said neck and provided with spaced lugs arranged over the before-mentioned abutments, a cap pivotally connected to the neck, a rotatable stem extending through the cap and normally positioned in the filling neck, a hub secured to the stem and vertically movable thereon, and locking bars projecting radially from said hub and adapted to be positioned under the lugs upon rotation of the stem, continued rotation of the stem forcing the bars against the aforesaid abutments and moving the hub vertically on the stem to force the bars against the under surfaces of the lugs to secure the cap in closing position on the filling neck.

3. In combination with a container having a filling neck, vertical abutments formed in said neck, and means for closing the neck comprising an annular collar surrounding said neck and provided with a flange arranged over the filling neck, said flange being provided with cut-out portions defining locking lugs therebetween, means connecting the flange and said abutments, a cap hingedly connected to the collar and locking means carried by the cap for engaging under the locking lugs.

4. In a closure for containers having a filling opening, locking lugs arranged over the opening, a cap hingedly secured adjacent the opening, a rotatable stem extending through the cap, a handle for rotating the stem, and locking bars carried by the stem and adapted upon rotation of the stem to be engaged under the before-mentioned locking lugs, continued rotation of said stem moving the bars upwardly whereby they are engaged against the under surfaces of said lugs to secure the cap in sealing relation with the filling opening.

5. In combination with a motor vehicle radiator having a filling neck, a closure therefor comprising locking lugs arranged over the neck, a cap pivotally connected to the neck, a stem extending through the cap and normally positioned in the neck, locking bars threadedly engaged with the stem and adapted to engage under the locking lugs, and a handle for rotating the stem for positioning the bars under the lugs and for moving the bars vertically whereby the latter are tightly engaged with the under surfaces of the lugs to firmly secure the cap to the filling neck.

6. In combination with a container having a filling neck, spaced horizontally arranged locking lugs positioned over said neck, a cap hingedly connected to the neck, and means for securing said cap in closing position with respect to the neck comprising locking bars carried by the cap, and means for moving the bars vertically to engage the same against the under surfaces of said locking lugs.

In witness whereof I have hereunto set my hand.

FRANK A. WHITTEN.